United States Patent
McLernon et al.

(10) Patent No.: US 8,875,039 B2
(45) Date of Patent: Oct. 28, 2014

(54) PROPAGATION OF CHARACTERISTICS IN A GRAPHICAL MODEL ENVIRONMENT

(75) Inventors: Michael H. McLernon, Attleboro, MA (US); Alex Rodriguez, Framingham, MA (US); Pieter J. Mosterman, Framingham, MA (US)

(73) Assignee: The MathWorks, Inc., Natick, MA (US)

( * ) Notice: Subject to any disclaimer, the term of this patent is extended or adjusted under 35 U.S.C. 154(b) by 1419 days.

(21) Appl. No.: 10/717,412

(22) Filed: Nov. 18, 2003

(65) Prior Publication Data

US 2005/0107998 A1    May 19, 2005

(51) Int. Cl.
G06F 3/048    (2013.01)
G06F 9/44    (2006.01)

(52) U.S. Cl.
CPC ............................ G06F 8/34 (2013.01)
USPC ........................................... 715/771

(58) Field of Classification Search
USPC ............... 715/748, 749, 763, 967, 769–771; 703/22
See application file for complete search history.

(56) References Cited

U.S. PATENT DOCUMENTS

| | | | | |
|---|---|---|---|---|
| 4,677,587 A * | 6/1987 | Zemany, Jr. | | 716/102 |
| 4,723,209 A * | 2/1988 | Hernandez et al. | | 715/210 |
| 4,831,524 A * | 5/1989 | Furgerson | | 716/102 |
| 4,868,785 A * | 9/1989 | Jordan et al. | | 345/440 |
| 5,155,836 A * | 10/1992 | Jordan et al. | | 703/23 |
| 5,301,336 A * | 4/1994 | Kodosky et al. | | 715/846 |
| 5,313,615 A * | 5/1994 | Newman et al. | | 716/11 |
| 5,386,568 A * | 1/1995 | Wold et al. | | 717/162 |
| 5,481,741 A * | 1/1996 | McKaskle et al. | | 345/522 |
| 5,659,723 A * | 8/1997 | Dimitrios et al. | | 1/1 |
| 5,838,949 A * | 11/1998 | Hassoun | | 703/13 |
| 5,950,001 A * | 9/1999 | Hamilton et al. | | 717/107 |
| 6,070,006 A * | 5/2000 | Iriuchijima et al. | | 717/108 |
| 6,195,092 B1 * | 2/2001 | Dhond et al. | | 715/763 |
| 6,263,492 B1 * | 7/2001 | Fraley et al. | | 717/107 |
| 6,300,949 B1 * | 10/2001 | Shudo et al. | | 715/744 |
| 6,407,753 B1 * | 6/2002 | Budinsky et al. | | 715/764 |
| 6,437,805 B1 * | 8/2002 | Sojoodi et al. | | 715/763 |
| 6,738,964 B1 * | 5/2004 | Zink et al. | | 717/105 |
| 6,748,583 B2 * | 6/2004 | Aizenbud-Reshef et al. | | 717/127 |
| 6,802,053 B1 * | 10/2004 | Dye et al. | | 717/113 |
| 6,862,030 B1 * | 3/2005 | Bachmann | | 715/772 |
| 6,877,138 B2 * | 4/2005 | Fitzpatrick et al. | | 715/769 |
| 7,000,180 B2 * | 2/2006 | Balthaser | | 715/240 |
| 7,010,622 B1 * | 3/2006 | Bauer et al. | | 709/252 |
| 7,089,306 B2 * | 8/2006 | Thorpe et al. | | 709/224 |
| 7,149,730 B2 * | 12/2006 | Mullins et al. | | 1/1 |

(Continued)

OTHER PUBLICATIONS

The Mathworks, "Simulink, model-based and system-based design" Using Simulink, Version 5, Jul. 2002, 50 pp.*

(Continued)

*Primary Examiner* — Phenuel Salomon
(74) *Attorney, Agent, or Firm* — Harrity & Harrity, LLP

(57) ABSTRACT

An electronic device and method are provided to enable a user to control characteristics of graphical objects of a graphical model environment without requiring manual entry of characteristics into each object. Propagation of characteristics from one or more objects to one or more objects may be specified and performed without requiring manual entry of characteristics into each objects. Examples of graphical model environments can include block diagrams, data-flow diagrams, state-based diagrams, circuit diagrams, mechanical diagrams, biological diagrams, network diagrams and software diagrams.

30 Claims, 6 Drawing Sheets

(56) References Cited

U.S. PATENT DOCUMENTS

| | | | |
|---|---|---|---|
| 7,269,648 B1* | 9/2007 | Krishnan et al. | 709/224 |
| 7,383,534 B1* | 6/2008 | Agbabian et al. | 717/120 |
| 7,406,682 B2* | 7/2008 | Todd et al. | 717/137 |
| 7,650,589 B2* | 1/2010 | Cifra | 717/105 |
| 2001/0000824 A1* | 5/2001 | Sako | 716/3 |
| 2002/0042903 A1* | 4/2002 | Sako | 716/3 |
| 2002/0069400 A1* | 6/2002 | Miloushev et al. | 717/108 |
| 2002/0083076 A1* | 6/2002 | Wucherer et al. | 707/102 |
| 2003/0016246 A1* | 1/2003 | Singh | 345/763 |
| 2003/0020762 A1* | 1/2003 | Budrys et al. | 345/835 |
| 2003/0098880 A1* | 5/2003 | Reddy et al. | 345/763 |
| 2003/0124595 A1* | 7/2003 | Lizardi | 435/6 |
| 2003/0132964 A1* | 7/2003 | Santori et al. | 345/763 |
| 2003/0208459 A1* | 11/2003 | Shea et al. | 707/1 |
| 2004/0031019 A1* | 2/2004 | Lamanna et al. | 717/125 |

OTHER PUBLICATIONS

The Mathworks, "Simulink, model-based and system-based design" Using Simulink, Version 5, Jul. 2002, pp. 478.*

* cited by examiner

PROPAGATION OF CHARACTERISTICS IN A GRAPHICAL MODEL ENVIRONMENT

FIELD OF THE INVENTION

The present invention relates generally to graphical models, and more particularly to the management of characteristics of a graphical model environment.

BACKGROUND OF THE INVENTION

Various classes of graphical models describe computations that can be performed on computational hardware, such as a computer, a microcontroller, a field programmable gate array (an FPGA), or custom hardware. Classes of such graphical models include time-based block diagrams, such as those found within Simulink® from the MathWorks, Inc. of Natick, Mass., state-based and flow diagrams, such as those found within Stateflow® from the MathWorks, Inc. of Natick, Mass., data-flow diagrams, circuit diagrams and software diagrams, such as those found in the Unified Modeling Language. A common characteristic among these various forms of block diagrams is that they define semantics on how to execute the diagram.

Historically, engineers and scientists have utilized time-based block diagram models in numerous scientific areas such as feedback control theory and signal processing to study, design, debug, and refine dynamic systems. Dynamic systems, which are characterized by the fact that their behaviors change over time, are representative of many real-world systems. Time-based block diagram modeling has become particularly attractive over the last few years with the advent of software packages such as Simulink®. Such packages provide sophisticated software platforms with a rich suite of support tools that makes the analysis and design of dynamic systems efficient, methodical, and cost-effective.

A dynamic system (either natural or man-made) is a system whose response at any given time is a function of its input stimuli, its current state, and the current time. Such systems range from simple to highly complex systems. Physical dynamic systems include a falling body, the rotation of the earth, bio-mechanical systems (muscles, joints, etc.), bio-chemical systems (gene expression, protein pathways), weather and climate pattern systems, etc. Examples of man-made or engineered dynamic systems include: a bouncing ball, a spring with a mass tied on an end, automobiles, airplanes, control systems in major appliances, communication networks, audio signal processing, nuclear reactors, a stock market, etc. Professionals from diverse areas such as engineering, science, education, and economics build mathematical models of dynamic systems in order to better understand system behavior as it changes with the progression of time. The mathematical models aid in building "better" systems, where "better" may be defined in terms of a variety of performance measures such as quality, time-to-market, cost, speed, size, power consumption, robustness, etc. The mathematical models also aid in analyzing, debugging and repairing existing systems (be it the human body or the anti-lock braking system in a car). The models may also serve an educational purpose of educating others on the basic principles governing physical systems. The models and results are often used as a scientific communication medium between humans. The term "model-based design" is used to refer to the use of block diagram models in the development, analysis, and validation of dynamic systems.

One difficulty of block diagram environments is the management of characteristics of the blocks of the block diagram. Each block may have ten, twenty, forty or more characteristics, many of which may be modified. Examples of characteristics include components, attributes, parameters, properties and methods of a block. A need exists to reduce the effort required in the control of characteristics of blocks of a block diagram.

SUMMARY OF THE INVENTION

There is a need in the art for an ability to provide a user with an ability to control characteristics of graphical objects of a graphical model environment without requiring manual entry of characteristics into each object. Various embodiments of the present invention provide propagation of characteristics from one or more objects to one or more objects, without requiring manual entry of characteristics into each object.

According to an embodiment of the invention, a medium is provided holding electronic device executable steps for a method in a block diagram environment. The method includes the steps of designating at least one source block and selecting at least one characteristic of the source block. Also, at least one destination block is designated and the selected characteristic is propagated to the destination block.

According to a further embodiment of the invention, also in a medium holding electronic device executable steps, a method is provided having the step of designating a plurality of source blocks. An intersection of characteristics common to the plurality of source blocks is determined, from which at least one characteristic is selected. A destination block is designated. The selected characteristic is then propagated to the destination block. In a variation of this embodiment, a further embodiment propagates at least one characteristic from a source block to a plurality of destination blocks.

In a further embodiment of the invention, an electronic device is provided having a block diagram environment. In the electronic device a method has the steps of designating at least one source block and selecting at least one characteristic of the source block. At least one destination block is also designated and the characteristic is propagated to the destination block.

A further embodiment of the invention provides a graphical user interface in an electronic device having a block diagram environment. The graphical user interface has a display of at least one characteristic of a source block eligible for propagation and a selection indicator to signify any characteristics of the at least one characteristic selected for propagation. An activation tool is also provided to confirm the selection of characteristics.

Examples of various other optional aspects of the invention include storing information relating to selecting and propagating characteristics and undoing the propagation of characteristics to return the characteristics of a destination block to a condition existing prior the propagation. Also, in an implementation of the invention, a destination block may optionally be designated before a source block is designated.

Various embodiments of the invention may be implemented with other forms of graphical model environments, such as data-flow diagrams, state-based diagrams, circuit diagrams, mechanical diagrams, biological diagrams, network diagrams and software diagrams. The invention may also be used to propagate characteristics of lines connecting blocks of a block diagram to other such lines.

BRIEF DESCRIPTION OF THE DRAWINGS

The present invention will become better understood with reference to the following description and accompanying drawings, wherein.

DETAILED DESCRIPTION

According to various embodiments of the invention, an electronic device and method are provided to enable a user to control characteristics of graphical objects of a graphical model environment without requiring manual entry of characteristics into each object. Propagation of characteristics from one or more objects to one or more objects may be specified and performed without requiring manual entry of characteristics into each object.

Dynamic systems are typically modeled as sets of differential, difference, and/or algebraic equations. At any given instant of time, these equations may be viewed as relationships between the system's output response ("outputs"), the system's input stimuli ("inputs") at that time, the current state of the system, the system parameters, and time. The state of the system may be thought of as a numerical representation of the dynamically changing configuration of the system. For instance, in a physical system modeling a simple pendulum, the state may be viewed as the current position and velocity of the pendulum. Similarly, a signal-processing system that filters a signal would maintain a set of previous inputs as the state. The system parameters are the numerical representation of the static (unchanging) configuration of the system and may be viewed as constant coefficients in the system's equations. For the pendulum example, the length of pendulum is a parameter, and for the filter example, the number of filter taps is a parameter.

Figure 1A:
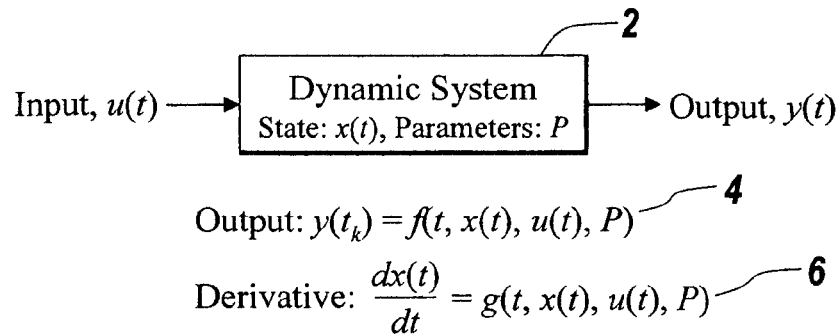
FIG. 1A depicts a dynamic system described with ordinary differential equations (ODE)

There are four common types of mathematical models used in the study of dynamic systems. The first type of mathematical model describes systems using ordinary differential equations (ODEs) and is depicted in FIG. 1A. The dynamic system 2 specifies a set of two equations: Output 4 and Derivative 6. The Output equation 4 facilitates the computation of the system's output response at a given time instant as a function of its inputs, states, parameters, and time. The Derivative equation 6 is an ordinary differential equation that allows the computation of the derivative of the states at the current time as a function of the inputs, the states, parameters, and time. This class of models is suitable for systems in which it is important to track the system response as a continuous function of time. Such continuous-time systems are commonly representative of physical systems (mechanical, thermal, electrical). For simple systems, it may be possible to use the Output 4 and Derivative equations 6 to obtain a closed-form solution for the output response y(t). But in most complex real world systems, the response of the system is obtained by integrating the states through numerical means.

The definition of an ODE used herein encompasses both implicit and explicit differential equations. The class of ordinary differential equations may require additional equations to define the system being modeled. For example, equations called projections may be required to impose constraints on the differential variables (e.g., states $X_1$ and $X_2$ must fall on the manifold defined by $X_1^2+X_2^2=25$). These constraints can be either applied as a secondary condition or a coupled condition to the differential equation. Although systems including the projections may conventionally no longer qualify as an ODE, they are included here to simplify the categories of systems. Another example is the use of a Jacobian equation that defines partial derivatives with respect to the independent and/or differential variables. The Jacobian equation is typically used when obtaining a linear approximation of a non-linear model or an overall linear model of a set of equations. Jacobian equations are required for some forms of numerical integration, for producing the linear model once the model has reached its steady state operating point, etc. The Output 4 and Derivatives equations 6 may be extended to define other relationships for the block. For example, the Output equation 4 may help manage its states by defining a relationship where it resets the state back to a known quantity at a specific point in time or when a specific condition is seen.

Figure 1B:
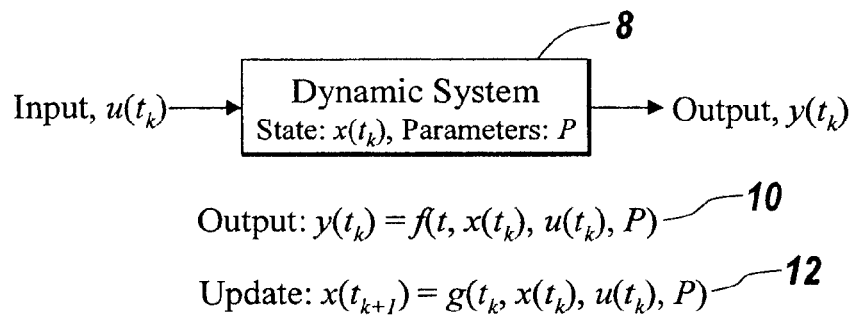
FIG. 1B depicts a dynamic system described with difference equations.

Another type of mathematical model describes systems using difference equations as depicted in FIG. 1B. The dynamic system 8 specifies a set of two equations: Output 10 and Update 12. The Output equation 10 facilitates the computation of the system's output response at a given time instant as a function of the inputs, states at some previous time, parameters, and time. The Update equation 12 is a difference equation that allows the computation of the states at the current time as a function of the inputs, states at some previous time, parameters, and time. This class of models is suitable for systems in which it is important to track the system response at discrete points in time. Such discrete-time systems are commonly representative of discrete-time control and digital signal processing systems. For simple systems, it may be possible to use the Output 10 and Update equations 12 to obtain a closed-form solution for the output response y(t). But in most complex real world systems, the response of the system is solved through recursion. The Output 10 and Update equations 12 are applied repeatedly to solve for the system response over a period of time.

Figure 1C:
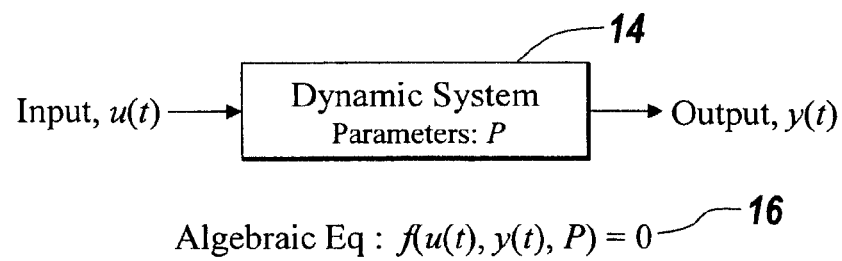
FIG. 1C depicts a dynamic system described with algebraic equations.

An additional type of mathematical model describes systems using algebraic equations as depicted in FIG. 1C. The dynamic system 14 uses an algebraic equation 16 that needs to be solved at each time to obtain the outputs. While simple systems may allow one to obtain a closed-form solution for the system inputs and outputs, practical algebraic equations may best be solved iteratively using a numerical method involving both perturbations and iterations. Algebraic equation solving techniques used in the context of dynamic system modeling are discussed in greater detail below.

A fourth type of mathematical model is a composite system that has components that fall into the three types of models discussed above. Most complex real-world system models fall into this category. This class of systems is described by Output, Derivative, Update, and potentially other equations. Solving for the output response of such systems requires a combination of the solution approaches discussed for all of the classes above. One example of a composite system is one described by differential-algebraic equations (DAEs) which contain both differential equations and algebraic equations.

Grouped within the composite class of systems are many extensions involving relationships (equations) defined in terms of both outputs and state. For example, one can define a limited integration relationship for a differential variable. This relationship requires a set of equations that consists of the Output equation, an Update equation, a Derivative equation, and a Zero Crossing equation. The Zero Crossing equation defines the points in time where the upper and lower limits of the limited integration occur. Another example of an extension is the notion of Enable and Disable equations that define relationships among states or signals when parts of a system are activated and deactivated during execution.

Inherent in the four classes of systems (ODE, difference equations, algebraic equations and composite) is the notion of system sample time. The sample time is the time interval at which the inputs, state, or outputs (collectively referred to as the results) of the system are traced as time progresses. Based on sample times, a system can be described as a discrete-time system, continuous-time system, or a hybrid system. A discrete-time system is a system in which the evolution of the system results is tracked at finite intervals of time. In the limit as the interval approaches zero, the discrete-time system becomes a continuous-time system. The intervals of time may be periodic or non-periodic. Sometimes, non-periodic rate systems are referred to as non-uniform rate systems meaning that there is no periodic rate at which the response can be tracked. Non-uniform-rate systems can fall into the class of composite systems where an additional equation (GetTimeOfNextVarHit) defines when in the future the other equations associated with the system should be evaluated. A continuous-time system is a system in which the evolutions of the system results are continuously changing. Continuous-time signals change during numerical integration (minor time steps). An example of a continuous-time system is one described by an ODE. There can also be algebraic or composite continuous-time systems. A hybrid system is a system with both discrete-time and continuous-time elements.

If a system has only one sample time, it is said to be single-rate. If a system has multiple sample times, it is said to be multi-rate. Multi-rate systems can be evaluated (executed) using either a single-tasking form of execution or a multi-tasking form of execution. When multi-tasking execution is used, it conforms to rate monotonic scheduling principles as defined by Liu, C. L., and LAYLAND, J. W. *Scheduling Algorithms for Multiprogramming in a Hard-Real-Time Environment.* ACM 20, 1 (January 1973), 46-61. Systems may also be categorized by the type of numerical integration solver being used. A fixed-step system is one that uses a fixed-step solver. Fixed-step solvers typically use explicit methods to compute the next continuous state at fixed periodic intervals of time. A variable-step system is one that is using a variable-step solver. A variable-step solver can use either implicit or explicit methods to compute the next continuous state at non-periodic intervals of time. Generally, variable-step solvers use a form of error control to adjust the interval size such that the desired error tolerances are achieved.

In practice, except for the most basic systems, mathematical models for dynamic systems involve a complex set of mathematical transformations applied in some prescribed manner with the outputs of some transformations forming the inputs of others. Each elemental transformation may be viewed in isolation as a simple dynamic system falling into one of the categories listed above. Therefore, a complex dynamic system may be modeled as an interconnection of various simple dynamic systems. A schematic representation of such an interconnection that has evolved over the years is the block diagram. Such block diagram models have now become a standard means in textbooks, design papers, journal articles, and specifications to communicate the details of a dynamic system's behavior.

Figure 2:
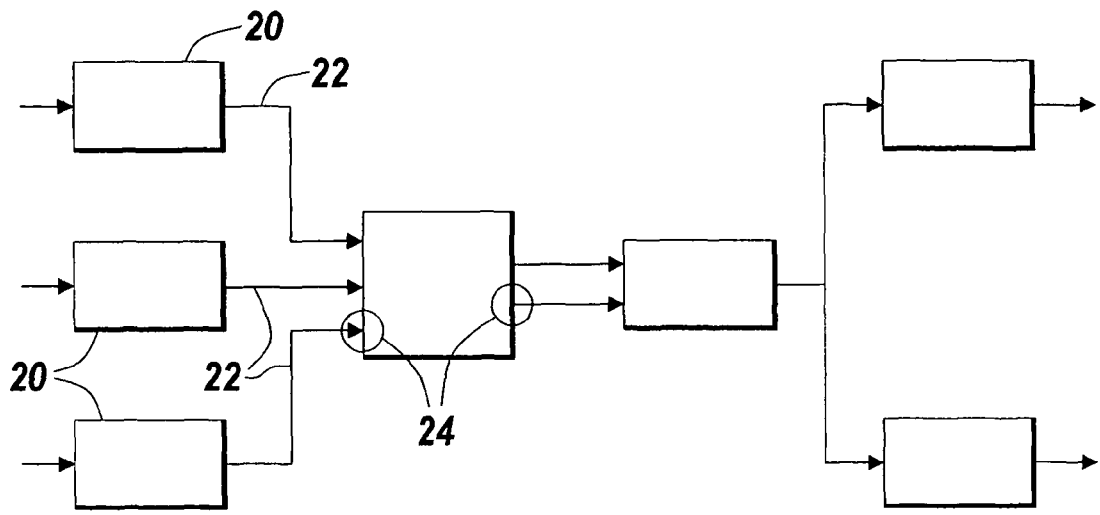
FIG. 2 depicts components of a basic block diagram.

A block diagram model of a dynamic system is represented schematically as a collection of blocks interconnected by lines that represent signals. A signal represents the input or output of a dynamic system. Each block represents an elemental dynamic system. A line emanating at one block and terminating at another signifies that the output of the first block is an input to the second block. Each distinct input or output on a block is referred to as a port. Signals correspond to the time-varying quantities represented by each line connection and are assumed to have values at each time instant. The source block of a signal writes to the signal at a given time instant when its system equations are solved. The destination blocks of this signal read from the signal when their system equations are being solved. The basic components of a block diagram are illustrated in FIG. 2. The block diagram includes a plurality of blocks 20, lines 22 and ports 24 that are interconnected. Those skilled in the art will recognize that the term "blocks" does not refer exclusively to elemental dynamic systems but may also include other modeling elements that aid in readability and modularity of block diagrams.

The theory of Digital Signal Processing (DSP) focuses on modeling signals as sequences of samples. This view naturally fits into the time-based block diagram paradigm by mapping the samples u[n] to discrete-time points $u(t_k)$. This adds the benefit of being able to model the interaction between DSP systems and other classes of time-based systems, e.g. continuous and/or discrete-time control systems.

Put another way, block diagram models are time-based relationships between signals and state variables representative of a dynamic system. The solution (computation of system response) of the model is obtained by evaluating these relationships over time, where time starts at a user-specified "start time" and ends at a user-specified "stop time". Each evaluation of these relationships is referred to as a time step. Signals represent quantities that change over time, and these quantities are defined for all points in time between the block diagram's start and stop time. The relationships between signals and state variables are defined by sets of equations represented by blocks. These equations define a relationship between the input signals, output signals, state, and time. Inherent in the definition is the notion of parameters, which are the coefficients of the equations.

Block diagrams are not exclusively used for representing time-based dynamic systems but also for other models of computation. For instance, flow-charts are block diagrams used to capture process flow and are not generally suitable for describing dynamic system behavior. Data flow block diagrams are block diagrams that describe a graphical programming paradigm where the availability of data (often thought of as tokens) is used to initiate the execution of blocks, where a block represents an operation and a line represents execution dependency describing the direction of data flowing between blocks. As used herein, the term block diagrams means time-based block diagrams used in the context of dynamic systems except as otherwise noted.

Block diagram modeling has spawned a variety of software products such as Simulink®, that cater to various aspects of dynamic system analysis and design. Such products allow users to perform various types of tasks including constructing system models through a user-interface that allows drafting block diagram models, allowing augmentation of a pre-defined set of blocks with custom user-specified blocks, the use of the block diagram model to compute and trace the temporal evolution of the dynamic system's outputs ("executing" the block diagram), and automatically producing either deployable software systems or descriptions of hardware systems that mimic the behavior of either the entire model or portions of it (referred to herein as "code generation"). Each of the tasks listed above has many intricate details and subtle variations which are explored further below.

Block modeling software includes a number of generic components. Although the discussion contained herein focuses on Simulink® version 5.0 (Release 13), those skilled in the art will recognize that it is applicable to other block modeling software applications. The generic components include a block diagram editor, blocks and a block diagram execution engine. The block diagram editor allows users to perform such actions as draw, connect, edit, annotate, save, and print out block diagram representations of dynamic systems. As noted earlier, blocks are the fundamental mathematical elements of a classic block diagram model. Simulink® extends the classic block diagram models by introducing the notion of two classes of blocks, non-virtual blocks and virtual blocks. Non-virtual blocks are elementary dynamic systems. A virtual block is provided for graphical or organizational convenience and plays no role in the definition of the system of equations described by the block diagram model. Examples of virtual blocks are the Bus Creator virtual block and Bus Selector virtual block which are used to reduce block diagram clutter by managing groups of signals as a "bundle". Virtual blocks may be used to improve the readability of models. Simulink® farther extends the meaning of a non-virtual block to include other semantics, such as a "merge" block semantic. The merge block semantic is such that on a given time step its output is equal to the last value written to an input of the merge block. An additional extension provided by Simulink® is the concept of conditional execution. Simulink® contains the concept of conditional and iterative subsystems that control when in time block methods execute for a sub-section of the overall block diagram.

A block diagram execution engine contributes to the modeling software task of enabling the computation and tracing of a dynamic system's outputs from its block diagram model. An execution engine carries out the task of compiling and linking the block diagram to produce an "in-memory executable" version of the model that is used for generating code and/or simulating or linearizing a block diagram model. Note that execution of the block diagram is also referred to as simulation. The compile stage involves checking the integrity and validity of the block interconnections in the block diagram. In this stage, the engine also sorts the blocks in the block diagram into hierarchical lists that are used when creating the block method execution lists. In the link stage, the execution engine uses the result of the compiled stage to allocate memory needed for the execution of the various components of the block diagram. The linking stage also produces block method execution lists which are used by the simulation or linearization of the block diagram. Included within the link stage is the initialization of the model which consists of evaluating "setup" methods (e.g. block start, initialize, enable, and constant output methods). The block method execution lists are generated because the simulation and/or linearization of a model must execute block methods by type (not by block) when they have a sample hit.

After linking has been performed, the execution engine may generate code. In this stage, the execution engine may choose to translate the block diagram model (or portions of it) into either software modules or hardware descriptions (broadly termed code). If this stage is performed, then the stages that follow use the generated code during the execution of the block diagram. If this stage is skipped completely, then the execution engine uses an interpretive mode of execution for the block diagram. In some cases, the user may not proceed further with the execution of the block diagram because they would like to deploy the code outside the confines of the block diagram software. Upon reaching the simulation stage, the execution engine uses a simulation loop to execute block methods in a pre-defined ordering upon a sample hit to produce the system responses they change with time.

For linearization, Simulink® uses the block method execution lists in a prescribed fashion to produce a linear state space representation of the dynamic system described by the block diagram.

The block diagram editor is the graphical user interface (GUI) component that allows drafting of block diagram models by a user. In Simulink®, there is also a textual interface with a set of commands that allow interaction with the graphical editor. Using this textual interface, users may write special scripts that perform automatic editing operations on the block diagram. A user generally interacts with a set of windows that act as canvases for the model. There is generally more than one window for a model because models may be partitioned into multiple hierarchical levels through the use of subsystems (discussed further below).

A suite of GUI tools in Simulink® allows users to draft a block diagram model on the corresponding windows. The GUI tools include a block palette, wiring line connection tool, annotation tool, formatting tool, attribute editing tool, save/load tool and publishing tool. The block palette is a library of all the pre-defined blocks available to the user when they are building the block diagram. Individual users may be able to customize this palette to: (a) reorganize blocks in some custom format, (b) delete blocks they do not use, and (c) add custom blocks they have designed. The palette allows blocks to be dragged through some human-machine interface (such as a mouse or keyboard) from the palette on to the window (i.e., model canvas). The graphical version of the block that is rendered on the canvas is called the icon for the block. There may be different embodiments for the block palette including a tree-based browser view of all of the blocks.

The wiring line connection tool allows users to draw directed lines that connect the ports of blocks in the model's window. Lines are also added through various mechanisms involving human-machine interfaces such as the mouse or keyboard. Simulink® also provides various forms of auto-connection tools that connect blocks automatically on user request to produce an aesthetically pleasing layout of the block diagram (especially those with high complexity with large numbers of blocks). The annotation tool allows users to add notes and annotations to various parts of the palette for a block diagram. The formatting tool enables users to perform various formatting operations that are generally available on any document editing tool. These operations help pick and modify the various graphical attributes of the block diagram (and constituent blocks) such as include font-selection, alignment & justification, color selection, etc. The block diagram and all the blocks within the block diagram generally have a set of functional attributes that are relevant for the execution or code-generation. The attribute editing tool provides GUIs that allows these attributes to be specified and edited. The save/load tool allows a created block diagram model to be saved. The saved model can be reopened in the editor at some later juncture through a load mechanism. Simulink® also allows users to save blocks including pre-constructed subsystems into a separate class of block diagrams called libraries. Such libraries facilitate reuse of the same block in a number of other block diagrams. The load/save mechanism is specially equipped to handle loading and saving of blocks in a block diagram that actually reside in libraries.

The publishing tool enables the viewing of the block diagram as a document that can be published in any of the standard document formats (examples: PostScript, Portable Document Format (PDF), HyperText Markup Language (HTML), etc.). Those skilled in the art will recognize that the windows for multiple models and all of the tools mentioned above could potentially be embedded in a single Multi-Document Interface (MDI) for providing a unified software environment. Those skilled in the art will also recognize that block diagram packages offer scripting languages for writing out programs that automatically carry out a series of operations that would normally require interaction with the GUI. For example, Simulink® offers a set of commands in MATLAB for carrying out operations such as block addition (add_block), block deletion (delete_block), starting and terminating execution (sim), modifying block attributes (set_param/get_param), etc.

Simulink® also offers a variety of other GUI tools that improve the ability of users to build and manage large block diagrams. Examples of such GUIs include: (a) a Finder that helps find various objects such as blocks and lines within a block diagram, (b) a Debugger that helps debug the execution of block diagrams, (c) a Revision Control User Interface (UI) for managing multiple revisions of the block diagram, and (d) a Profiler for viewing timing results while executing a block diagram.

A typical base data-structure for a block may be represented as:

```
class Block {
public:
    // Access methods for setting/getting block data
    ...
    // Methods for block editing
    virtual ErrorStatus BlockDrawIcon( );
    virtual BlockParameterData BlockGetParameterData( );
    ...
    // Methods for block compilation
    ...
    // Methods for block execution
    ...........................................
    virtual ErrorStatus BlockOutput( )     = 0;
    virtual ErrorStatus BlockDerivative( ) = 0;
    virtual ErrorStatus BlockUpdate( )     = 0;
    ...
private:
    BlockGraphicalData blkGraphicalAttributes;
    BlockFunctionalData blkFunctionalAttributes;
    BlockCompiledData blkCompiledAttributes;
    BlockExecutionData blkExecutionData;
    ...
};
```

Although the example of the data structure above is written in C++, those skilled in the art will recognize that equivalent data structures written in other languages may also be used. The major data fields of the block data structure fall into four categories; a graphical attributes field, a functional attributes field, a compiled attributes field and an execution data field.

The graphical attributes field is responsible for storing information relevant for graphical rendering of the block within its parent block diagram's GUI. Attributes specific to the block icon such as font, color, name, and icon-image are stored in this field. It should be noted that modifying these attributes does not affect the dynamics of the model using this block. The functional attributes field is responsible for specifying block attributes that may potentially affect the dynamics of the model using this block. These attributes are specified for the block as a whole and the input and output ports of the block. Examples of block attributes include block sample times and restrictive flags. Block sample times specify if the block corresponds to an elemental, continuous, discrete, or hybrid dynamic system. If the block is an elemental discrete-time system, then the attribute specifies the spacing between time instants at which the block response should be traced. A restrictive flag disallows the use of blocks in certain modeling contexts. For example, one may impose the restriction that there may only be one instance of given block in a model.

Attributes of block ports specify properties of the data that are either available or produced at that port. Block port attributes include dimensions, datatypes, sample rates, and direct feedthrough. Dimension attributes are individual dimensions of a multi-dimensional matrix that is used as a container for data elements. Datatype attributes are the datatype of each element of data in the data container. A complexity attribute is a flag to specify if each data element is real or complex. A sample rate attribute specifies how the signal corresponding to an input or output port will be used. The port sample times may sometimes be used to implicitly infer the block's sample time. The direct feedthrough attribute is specified only for input ports and indicates whether or not the Output and/or GetTimeOfNextHit equations of the block are a function of the given input. This attribute helps in determining the sequence in which block methods should be executed while executing the block diagram.

The compiled attributes field of the block data structure holds the attributes of the block and its ports that mirror the functional attributes listed above. This field is filled in during block diagram compilation by utilizing the functional attributes of the block in conjunction with the functional and compiled attributes of the blocks that are connected to it. This process of determining the compiled attributes from the functional attributes is termed attribute propagation. Attribute propagation is described in greater detail below in the section on block diagram compilation. The execution data field is mainly responsible for storing the memory locations that are going to serve as sources for block inputs, outputs, states, parameters, and other work areas during execution of blocks.

The block data structure also has a set of associated methods that may be categorized as access methods to data fields, methods used in editing, methods used in compilation and methods used in execution. Access methods to data fields help in setting and getting the various data fields of the block. Methods used in editing are called by the block diagram editor in order to render the block appropriately in the GUI of its parent block diagram. For instance, this set of methods may include a BlockDrawIcon method that determines the shape the block icon has on the GUI. Methods used in compilation are methods that are called by the block diagram compilation engine. They help validate the connections of the block to other blocks on the block diagram. The methods used in execution include a number of different run-time methods that are required for execution. These include the BlockOutput, BlockUpdate, BlockDerivative methods that realize the Output, Update, and Derivative equations discussed earlier in the context of dynamic systems. In addition to these methods, Simulink® includes several other run-time methods, such as the Jacobian, Projection, ZeroCrossings, Enable, Disable, Initialize, EvalParams (check and process parameters), and GetTimeOfNextHit methods. It should be noted that there is no explicit method for algebraic equations because these are represented and processed in a different manner which will be discussed below.

Figure 3:
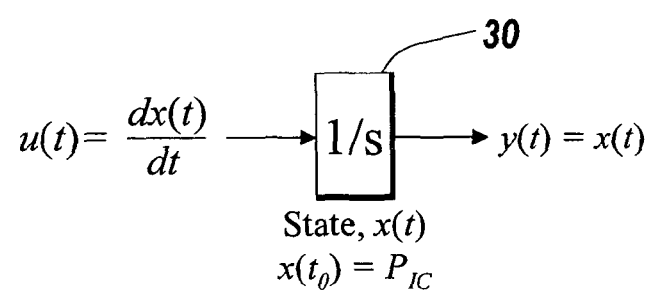
FIG. 3 depicts the desired behavior of an integrator block.

The base data structure for the block specifies the generic fields and interfaces that need to be supported by a block. Some of the methods are purely virtual and have no specific implementation in the base block class. In order to define a specific block (such as an Integrator block), one needs to subclass the base block class and provide explicit definitions for these virtual methods. An example of the subclassing of a block may be seen by examining an Integrator block. FIG. 3 depicts the desired behavior of an Integrator block 30. In order to create the subclass, four major categories of information within the subclass must be specified; the block parameters, the methods used in editing, the methods used in compilation, and the methods used in execution. The elemental dynamic system embodied by the block may be parameterized as illustrated in FIGS. 1A-1C. Each block needs to be able to specify its list of expected parameters. The block diagram editor's Attribute-Editing tool may allow users to specify the parameters for the block when they use it in their models. In the Integrator block example, the block has one parameter that specifies the block's initial condition for the block's state. Regarding the methods used in editing, the subclass needs to specify a method that renders its icon. For example, the Integrator block may implement a method that makes its icon to be a box with a '1/s' within the box. Also, the subclass needs to instantiate a method that allows access to the block parameters from the GUI's Attribute-Editing tool. For the Integrator example, this method would allow users to specify the Initial Condition parameter on a GUI for the block. For the methods used in compilation, the subclass needs to instantiate methods that help in the compilation of the block diagram model in which it is placed. These methods help specify the compiled information for the inputs and outputs of the block. For instance, the Integrator block may specify a method that ensures that if the input to the Integrator is a vector, then the output is a vector of the same size. For methods used in execution, the subclass needs to instantiate specific Output, Derivative, and Update methods that represent the block behavior. In the case of the Integrator block, an Output and Derivative method are needed. It should be noted that in Simulink® the Integrator block has additional methods that are not illustrated here. The Output method sets the output to be equal to the state. The Derivative method sets the derivative of the state to be equal to the input.

The specification of these four types of information for the Integrator block subclass may be shown by a reduced form of the Simulink® Integrator block:

```
IntegratorBlock : public Block {
public:
    ErrorStatus BlockDrawIcon( ) {
        //Draw '1/s' on the icon
        ............................
    }
    BlockParameterData BlockGetParameterData( ) {
        // Return initial_condition as block data
        ............................
    }
    ErrorStatus BlockOutput( ){
        // Implement y(t) = x(t)
        ............................
    }
    ErrorStatus BlockDerivative( ){
        // Implement dx(t)/dt = u(t)
        ............................
    }
private:
    double initial_condition;
};
```

It should be noted that block diagram software generally provides open access to the block's data structure to users of the software. This allows users to create and utilize custom block implementations in their models.

Blocks in a block diagram may be virtual or non-virtual. The designation of a block as non-virtual indicates that it influence the equations in the mathematical model for the dynamic system. In the context of block diagram software, it is beneficial to include other virtual blocks that do not affect the equations in the dynamic system's model. Such blocks help improve the readability and modularity of the block diagram and wield no semantic influence on the mathematical model. Examples of such virtual blocks include virtual subsystems, inport blocks and outport blocks, bus creator blocks and From and Goto blocks.

Modularity may be achieved in a block diagram by layering the block diagram through the use of subsystems. A subsystem facilitates layering by allowing a collection of blocks to be represented by a single block with input and output signals. The input and output signals of the subsystem are accessible to the constituent blocks within the subsystem. A subsystem is a virtual subsystem if its constituent blocks are moved back into the main block diagram model during the model's execution. Within a virtual subsystem graphical entities, called inport and outport blocks, are provided to define signal connections to the parent block diagram. These inport and outport blocks indicate a tunnel-through signal connection to the parent block diagram.

Additional types of virtual blocks include bus creator blocks and selector blocks. In large models, there may be an extensive set of lines that connect one section of a block diagram to another section. To avoid excessive clutter of lines and improve readability, there is typically a special block called a Bus Creator that helps bundle all of the lines together to form a single bus line. This single bus line then connects the two sections of the model. At the destination end of the line, a block called a Bus Selector helps un-bundle the individual lines so that they can be connected to other blocks.

Other virtual blocks include From blocks and Goto blocks that are special blocks that help avoid graphical clutter, e.g. a line that connects two distant sections of a block diagram. The line is terminated close to its originating point by a From block. At the other end, a new line is drawn from a Goto block that is hot-linked to the From block. Each Goto and From block has an associated tag that describes which blocks are connected together. An important point to be noted is that Virtual blocks have neither execution data nor execution methods in their data structure.

Simulink also provides the user with the ability to extend the simulator by providing the ability to enhance the simulator with blocks that define dynamic systems or are virtual properties. The extension is provided through a language independent Application programming Interface (API) (e.g. C, C++, Ada, Fortran, Assembly, M).

As noted previously, to facilitate modeling fairly large and complex dynamic systems, Simulink allows users to layer their block diagrams. A subsystem facilitates such layering by allowing a collection of blocks to be represented by a single block with input and output signals. The input and output signals of the subsystem are accessible to its constituent blocks. By nesting subsystems within each other, one can create block diagrams with arbitrary layers of hierarchy. Ideally a subsystem has no impact on the meaning of the block diagram. Additionally, subsystems provide a way of grouping blocks together and allowing other block diagram constructs to impose unified control on the constituent blocks. To enhance the modularity of subsystems, modeling software also allows aggregated list(s) of parameters of the blocks within the subsystem to be accessed from a single GUI, and defines and displays special icons on the subsystems. The process of defining the parameter list and the special icon is called masking a subsystem.

There are two main types of subsystem blocks, virtual subsystems and non-virtual subsystems. Virtual subsystems serve the purpose of providing the block diagram with a graphical hierarchy. Non-virtual subsystems behave like an elemental dynamic system with its own execution methods (Output, Update, Derivatives, etc.). These execution methods in turn call the execution methods of the constituent blocks.

By way of example, classes of non-virtual subsystems are:

Atomic subsystems. These are similar to virtual subsystems, with the advantage of grouping functional aspects of models at a given layer. This is useful in modular design.

Conditionally-executed subsystems. These are non-virtual subsystems that execute only when a precondition is fulfilled:

Enabled subsystems. These are similar to Atomic subsystems, except that the constituent blocks only execute when an enable signal feeding the subsystem is greater than zero.

Triggered subsystems. These are similar to Atomic subsystems, except that the constituent blocks only execute when a rising and/or falling signal is seen on a triggering signal feeding the subsystem.

Enable with Trigger subsystems. These are an intersection of the properties of Enabled and Triggered subsystems.

Action subsystems. These subsystems are connected to action-initiator (e.g., an "If" or "SwitchCase" block), a block that explicitly commands the subsystem contents to execute. These subsystems are similar to Enabled subsystems except that the management of the "enabling" signal has been delegated to an action-initiator. Action subsystems define a new type of signal, called an action signal that signifies which subsystems are commanded to execute by the action-initiator.

Function-call subsystems. These subsystems provide a means of collecting blocks into a subsystem that is only executed when called by an owner block. The owner block may compute input signals for the subsystem before calling the subsystem. Additionally, the owner may also read output signals from the subsystem after calling it. Function-call subsystems define a new type of execution control signal, called a function-call signal that contains no data. It is used to define the execution relationship between the owner block and the function-call subsystem. Function-call owners may also designate themselves as an "interrupt" source. In simulation, they simulate the effects of an interrupt and in code generation they can attach themselves to an (asynchronous) interrupt.

While subsystems and For subsystems. These subsystems execute the constituent blocks multiple times on a given time step.

Simulink allows for several forms of block parameters to be defined. There are two general categories of parameters: those parameters that can be modified during simulation and those that cannot be modified. An example of a parameter that may be modified during simulation is the amplitude of a Sine Wave block if configured by the user to allow modification during execution. A parameter such as the amplitude specifies coefficients of the dynamic equation, in this case the amplitude of the sine wave function defined by the Sine Wave block. An example of a parameter that can never be modified during simulation is the sample time of the Sine Wave block. The parameters that can be modified during simulation are further broken down into other categories which include mapping the dialog parameter (e.g. the amplitude) to run-time parameters or converting the dialog parameter to an inlined (non-modifiable) parameter. Run-time parameters can further be mapped to mathematical expressions of tunable Matlab variables or Matlab parameter objects describing properties of the variables (called Simulink.Parameters). A global run-time parameter data structure is used within Simulink to manage the block parameters during the execution of the model.

In addition to block parameters, there are model-wide parameters which are generally associated with the solver. These parameters include aspects such as the time span in which to perform a simulation, the type of solver, and the time step. Simulink gives the user the ability to adjust solver parameters during model execution. The adjustment of these solver parameters is performed at the start of a time step.

Figure 4:
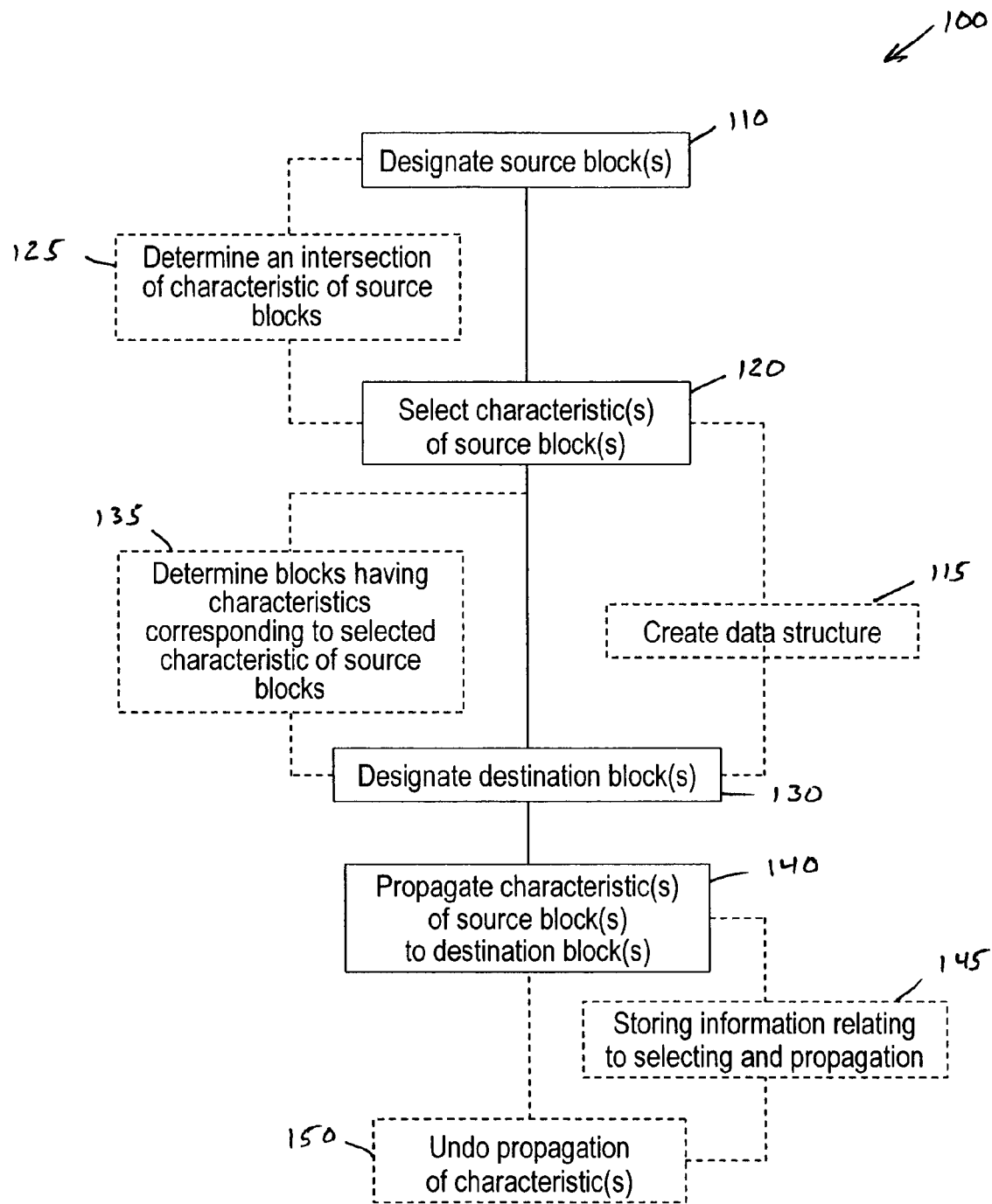
FIG. 4 is an illustration of a method according to an illustrative embodiment of the invention.

According to an illustrative embodiment of the invention, a method 100 for propagating characteristics of one or more blocks is provided as illustrated in FIG. 4. Examples of characteristics include components, attributes, parameters, properties and methods of a block. Embodiments of the present invention can be used with state charts, scopes, figures, models and other entities that contain characteristics that can be specified by the user. According to the method, at least one source block is designated, step 110. A structure may optionally be created, step 115, that corresponds to the source block characteristics eligible for propagation. The structure may optionally be automatically created and may optionally include one or more substructures corresponding to subcategories of the characteristics eligible for propagation.

Figure 5:
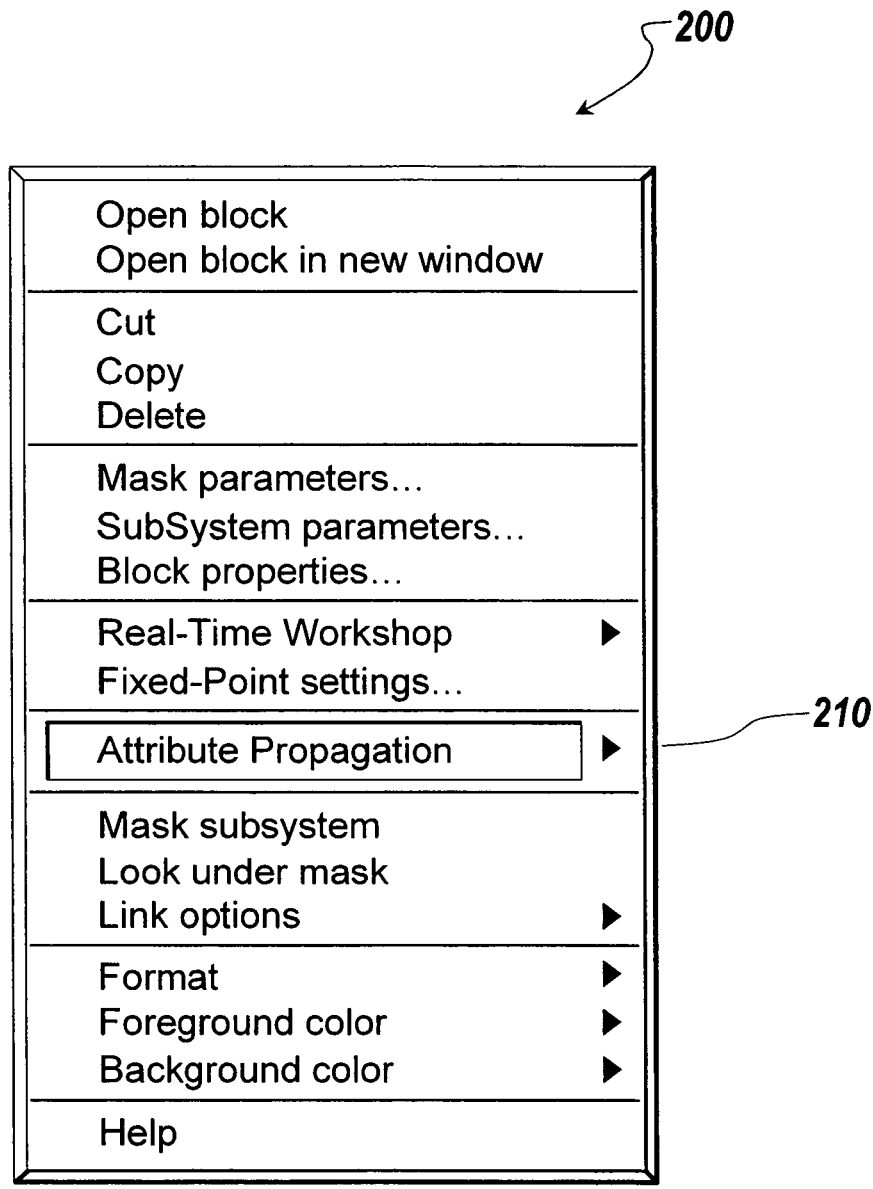
FIG. 5 is a pop-up menu according to an implementation of the invention.

The source block may be designated from a graphical user interface (GUI) providing a graphical representation of at least part of a block diagram environment or a textual list of blocks in the block diagram environment. A user may designate at least one source block by the use of a mouse, such as by the use of a right click to call up a pop up menu 200, such as is illustrated by way of example in FIG. 5. Although the content of the pop up menu 200 may consist of any of a wide variety of options, the characteristic propagation selection 210 is illustrated by way of example as one option to enable a user to begin the characteristic propagation process. Optionally, a multi-level pull down menu may be used upon activation of the characteristic propagation selection 210 to provide a list of characteristics eligible for propagation. Alternatively or in addition, a shortcut key may be configured to trigger a menu of characteristics eligible for propagation, or to automatically propagate all eligible characteristics between a source and destination block or a predefined subset of characteristics.

Figure 6:
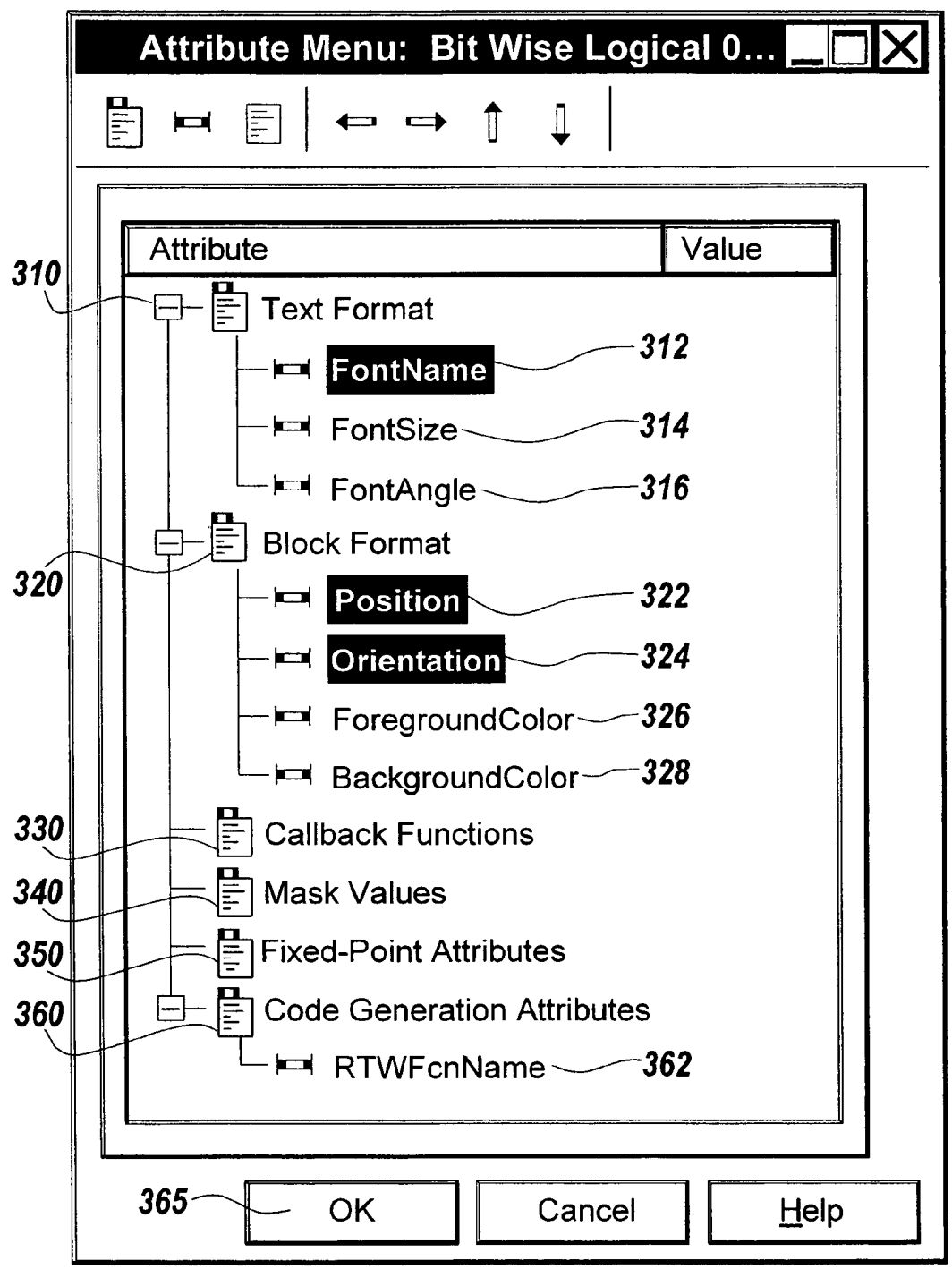
FIG. 6 is a graphical user interface according to an implementation of the invention.

With reference to the method 100 of FIG. 4, at least one characteristic of the source block is selected, step 120, for propagation. A graphical user interface (GUI) may be used to facilitate the display and selection of characteristics of the source block. An example of a GUI 300 is illustrated in FIG. 6. As shown in the GUI 300, the characteristics of the source block may optionally be displayed in the hierarchical structure. For example, top level categories such as text format 310, block format 320, callback functions 330, mask values 340, fixed point attributes 350 and code generation attributes 360 may be displayed in an expandable menu format. As illustrated in FIG. 6, the text format 310, block format 320 and code generation attributes 360 menus are illustrated in an expanded form. For source blocks that do not contain any characteristics corresponding to one of the top level categories, the top level category may be listed as a non-expandable menu choice, such as is shown in FIG. 6 for the top level categories of callback functions 330, mask values 340 and fixed point attributes 350. Alternatively, the top level categories having no characteristics corresponding to the source block may be omitted from the menu. Optionally, the characteristics for propagation may be selected before selecting the source and/or destination blocks.

The characteristics eligible for propagation are displayed in the GUI 300. Examples in the present illustrative example include font name 312, font size 314, font angle 316, block format position 322, block format orientation 324, foreground color 326, background color 328 and Real-Time Workshop® function name (RTWFcn name) 362. In the present example, the characteristics selected for propagation include font name 312, block format position 322 and block format orientation 324. An activation tool 365, such as a button, is provided to confirm the selection of characteristics.

With reference to the method 100 of FIG. 4, at least one destination block is designated, step 130. In one example, elements of the optional structure created in association with the designation of the source block, step 110, may be associated with the data structure of the destination block. Optionally, blocks of the block diagram environment having the types of characteristics selected for propagation may be determined, step 135, to enable a user to select from a list or display of eligible destination blocks.

The selected characteristics of the source block that correspond to types of characteristics present in the destination block are then propagated, step 140. It is understood that these steps can involve one or more source blocks, characteristics, and/or destination blocks.

Whereas typically, a value will be propagated for a given characteristic from the source block to the destination block, optionally, the destination block may not have the characteristic before propagation. For example, the destination block may first be provided with the characteristic by propagation. This may result in changing destination block type by the addition of a characteristic.

Optionally, the destination block may be designated before the selection of the characteristics for propagation. In such a case, the selection of characteristics eligible for propagation can be manually selected and/or based on types of characteristics common between the source block and destination block. For example, the GUI 300 may only display characteristics from an intersection of the characteristics of the source and destination blocks. Alternatively, the GUI 300 could display all characteristics of the source and destination blocks, while indicating those characteristics that are ineligible for propagation, such as by displaying such characteristics in a faded text.

According to another implementation of the invention, the destination block may be designated before the source block is designated. In such a case, the destination block may be selected by a user from a display of other similar blocks from which characteristics could be propagated. Similar blocks could include, for example, blocks having the same parent or blocks having similar functionality, such as source blocks or channel blocks. Although the characteristics for propagation may be manually selected, characteristics eligible for propagation may be determined automatically by listing similar types of characteristics among the destination and source blocks.

Optionally, by retaining information corresponding to the original characteristics of the destination blocks, the propagation of characteristics from the source block to the destination block may be undone, step 150, by replacing the original characteristics of the destination blocks to their values prior to the propagation of the characteristics.

The method 100 is also applicable for use with a plurality of source blocks and/or a plurality of destination blocks. Such implementations of the invention could propagate characteristics from one block to many blocks or from many blocks to one block. In the event that a plurality of source blocks are selected, the characteristics eligible for selection, step 120, by a user and propagation may be determined from an intersection of all source blocks, step 125. For example, the user may be presented with a list of the characteristics found in each of the source blocks, from which some or all may be selected for propagation. In one example, the intersection looks only to the type of characteristics; in another example, the intersection looks also to the characteristic value. In the first example, if two source blocks are selected, each having a Background-Color characteristic, the BackgroundColor characteristic would be available for selection to be propagated. In the second example, the two source blocks would also have to have a matching value, such as orange, to be available for selection for propagation. The first example may provide further opportunities for a user to be made aware of the different characteristic value and select the desired value for propagation, or a default may be used to proceed with a value in the event of a conflict without further user input required.

In the case of a plurality of destination blocks being selected, an embodiment of the invention may be configured to propagate only those characteristics determined by an intersection of all source blocks, such as is described above, or may propagate all selected characteristics as appropriate for each individual destination block, namely placing any selected characteristic for propagation in each of the blocks having such a characteristic, regardless of whether all of the source blocks have such a characteristic.

Optionally, a source block may be designated as a predetermined member of the destination blocks. For example, a source block could be considered to be the first, or the last, of the designated destination blocks.

Optionally, the invention can involve propagating more than one value for a given characteristic. For example, if two source blocks are selected, each having different values for a given characteristic, propagation of the different values can be accomplished to a plurality of destination blocks. Values may be allocated to destination blocks by order of designation or by respective contexts of the blocks. For example, similarities among blocks connected to a source block and those connected to a destination block can be used to assign the value from the specific source block to the specific destination block. Another example of a respective context could be the subsystem in which the block is used.

According to an implementation of the invention, information relating to selection of source blocks, destination blocks and/or characteristics to be propagated can be stored, step 145. Therefore, a selection of a characteristic of a source block, step 120, may be made by displaying at least some of the previous propagations, allowing a user to select a previous propagation to be repeated. The display of the previous propagations can be by, for example, a favorite list or a palette of previous propagations. The previous propagations may be described, for example, by a user-selected name and/or a user programmed key stroke combination, a representation of the source and/or destination blocks, and/or a representation of the characteristics propagated. As such, the use of the display of the previous propagations can provide an opportunity for the user to more easily designate a source block, step 110, select a characteristic of a source block, step 120, and/or designate a destination block, step 130, or any combination steps thereof, including the designation of a destination block 130 before a source block, step 110. It is understood that these steps can involve one or more source blocks, characteristics, and/or destination blocks.

Embodiments of the invention may operate with hierarchical block diagrams in a variety of ways. For example, according to an illustrative embodiment of the invention, a user can configure how the engine deals with hierarchical subsystems, which may contain blocks of different nature. In one implementation, a user can configure the designation of the source block, step 110, to apply only to the top-level block or to include both the top-level and lower-level blocks, e.g. the subsystem-level blocks as designated source blocks. Likewise, the step of selection of characteristics of the source blocks would then apply to the selected source blocks, whether top-level only, or inclusive of the subsystem blocks. The designation of the destination block, step 130, can also be configured to apply only to the top-level block or to include both the top-level and lower-level blocks. Alternatively or in addition, the propagation of characteristics, step 140, can be restricted to the propagation to the characteristics of the top-level block, such as the block explicitly selected by the user, or include subsystem-level blocks.

Alternatively, such configurations could be specified in advance, so that a user does not have those choices. Optionally, a short key, menu selection or other convention can be used, such as holding down a Shift key, to designate whether to apply a step, such as designating a source block, a destination block or characteristics to propagate to only the top-level block or to include both the top-level and lower-level blocks.

The propagation of characteristics of the source block to the destination block, step 140, may be implemented in a wide variety of methods. For example, characteristics selected for propagation may be copied from a source block data structure, or multiple data structures, to the destination block data structure, or multiple data structures. As noted above, a structure may optionally be created that corresponds to the source block characteristics eligible for propagation. In such a case, the characteristics selected for propagation may be copied from the structure to a destination block data structure, or multiple data structures. In a further example, a temporary structure may be created, such as a structure for storing the characteristics selected for propagation. The characteristics can then be copied from the temporary structure to the destination block data structure, or multiple data structures. It is understood that these are merely examples of methods for propagating at least one characteristic of a source block to a destination block and that other programmatic techniques that are within the scope of the invention may be apparent to one of skill in the art upon review of this description.

The invention can also be used with a textual listing of components of a graphical model environment. For example, a list of the object in the graphical model may be designated as source or destination blocks by selecting the objects from a list.

It is understood that the invention is applicable to a wide range of characteristics. Although the invention is not limited, examples of characteristics pertaining to Simulink®, and associated programs from The MathWorks, Inc. of Natick, Mass., are provided in Tables 1-5. Use of the characteristics such as those listed by way of example in Tables 1-5 is within the scope of the invention. Table 1 lists examples of characteristics associated with a Simulink® model.

TABLE 1

Model Characteristics

| Parameter | Description | Values |
| --- | --- | --- |
| AbsTol | Absolute error tolerance | scalar {1e−6} |
| AlgebraicLoopMsg | Algebraic loop diagnostic | none | {warning} | error |
| ArrayBoundsChecking | Enable array bounds checking | 'none' | 'warning' | 'error' |
| BooleanDataType | Enable Boolean mode | on | {off} |
| BufferReuse | Enable reuse of block I/O buffers | {on} | off |
| CloseFcn | Close callback | command or variable |
| ConfigurationManager | Configuration manager for this model | text |
| ConsistencyChecking | Consistency checking | on | {off} |
| Created | Date and time model was created | text |
| Creator | Name of model creator | text |
| Decimation | Decimation factor | scalar {1} |
| DefaultBlockFontSize | Default font size for blocks contained by this model | {10} |
| Description | Description of this model | text |
| ExternalInput | Time and input variable names | scalar or vector [t, u] |
| FinalStateName | Final state name | variable {xFinal} |
| FixedStep | Fixed step size | scalar {auto} |
| InitialState | Initial state name or values | variable or vector {xInitial} |
| InitialStep | Initial step size | scalar {auto} |
| InvariantConstants | Invariant constant setting | on | {off} |
| LimitDataPoints | Limit output | on | {off} |
| LoadExternalInput | Load input from workspace | on | {off} |
| LoadInitialState | Load initial state | on | {off} |
| MaxDataPoints | Maximum number of output data points to save | scalar {1000} |

TABLE 1-continued

Model Characteristics

| Parameter | Description | Values |
| --- | --- | --- |
| MaxOrder | Maximum order for ode15s | 1 | 2 | 3 | 4 | {5} |
| MaxStep | Maximum step size | scalar {auto} |
| MinStepSizeMsg | Minimum step size diagnostic | {warning} | error |
| ModelVersionFormat | Format of model's version number | text |
| ModifiedBy | Last modifier of this model | text |
| ModifiedDateFormat | Format of modified date | text |
| Name | Model name | text |
| ObjectParameters | Names/attributes of model parameters | structure |
| OutputOption | Output option | AdditionalOutputTimes | {RefineOutputTimes} | SpecifiedOutputTimes |
| OutputSaveName | Simulation output name | variable {yout} |
| OutputTimes | Values for chosen OutputOption | vector {[]} |
| PaperOrientation | Printing paper orientation | portrait | {landscape} |
| PaperPosition | Position of diagram on paper | [left, bottom, width, height] |
| PaperPositionMode | Paper position mode | auto | {manual} |
| PaperSize | Size of PaperType in PaperUnits | [width height] (read only) |
| PaperType | Printing paper type | {usletter} | uslegal | a0 | a1 | a2 | a3 | a4 | a5 | b0 | b1 | b2 | b3 | b4 | b5 | arch-A | arch-B | arch-C | arch-D | arch-E | A | B | C | D | E | tabloid |
| PaperUnits | Printing paper size units | normalized | {inches} | centimeters | points |
| PostLoadFcn | Post-load callback | command or variable |
| PreLoadFcn | Preload callback | command or variable |
| Refine | Refine factor | scalar {1} |
| RelTol | Relative error tolerance | scalar {1e−3} |
| SampleTimeColors | Sample Time Colors | on | {off} |
| SaveFcn | Save callback | command or variable |
| SaveFinalState | Save final state | on | {off} |
| SaveFormat | Format used to save data to the MATLAB workspace | Array | Structure | StructureWithTime |
| SaveOutput | Save simulation output | {on} | off |
| SaveState | Save states | on | {off} |
| SaveTime | Save simulation time | {on} | off |
| ScreenColor | Background color of the model window | black | {white} | red | green | blue | cyan | magenta | yellow | gray | lightBlue | orange | darkGreen |
| ShowLineWidths | Show Line Widths menu option | on | {off} |
| SimulationCommand | Executes a simulation command. | start | stop | pause | continue | update |
| SimParamPage | Simulation Parameters dialog box page to display (page last displayed) | {Solver} | WorkspaceI/O | Diagnostics |
| Solver | Solver | {ode45} | ode23 | ode113 | ode15s | ode23s | ode5 | ode4 | ode3 | ode2 | ode1 | FixedStepDiscrete | VariableStepDiscrete |
| StartFcn | Start simulation callback | command or variable |
| StartTime | Simulation start time | scalar {0.0} |
| StateSaveName | State output name | variable {xout} |
| StopFcn | Stop simulation callback | command or variable |
| StopTime | Simulation stop time | scalar {10.0} |
| TimeSaveName | Simulation time name | variable {tout} |
| UnconnectedInputMsg | Unconnected input ports diagnostic | none | {warning} | error |
| UnconnectedLineMsg | Unconnected lines ports diagnostic | none | {warning} | error |
| UnconnectedOutputMsg | Unconnected output ports diagnostic | none | {warning} | error |

TABLE 1-continued

Model Characteristics

| Parameter | Description | Values |
|---|---|---|
| Version | Simulink ® version used to modify the model (read-only) | (release) |
| WideVectorLines | Wide Vector Lines menu option | on | {off} |
| ZeroCross | Intrinsic zero-crossing detection | {on} | off |

Table 2 lists examples of common block characteristics associated with blocks of a Simulink® model.

TABLE 2

Common Block Characteristics

| Parameter | Description | Values |
|---|---|---|
| AttributesFormat String | Specifies parameters to be displayed below block in a block diagram | string |
| BackgroundColor | Block icon background | black | {white} | red | green | blue | cyan | magenta | yellow | gray | lightBlue | orange | darkGreen |
| BlockDescription | Block description | text |
| BlockType | Block type | text |
| CloseFcn | Close callback | MATLAB expression |
| CompiledPortWidths | Structure of port widths | scalar and vector |
| CopyFcn | Copy callback | MATLAB expression |
| DeleteFcn | Delete callback | MATLAB expression |
| Description | User-specifiable description | text |
| DialogParameters | Names/attributes of parameters in blocks parameters dialog | structure |
| DropShadow | Display drop shadow | {off} | on |
| FontAngle | Font angle | (system-dependent) {normal} | italic | oblique |
| FontName | Font | {Helvetica} |
| FontSize | Font size. A value of −1 specifies that this block inherits the font size specified by the DefaultBlockFontSize model parameter. | {−1} |
| FontWeight | Font weight | (system-dependent) light | {normal} | demi | bold |
| ForegroundColor | Block name, icon, outline, output signals, and signal label | {black} | white | red | green | blue | cyan | magenta | yellow | gray | lightBlue | orange | darkGreen |
| InitFcn | Initialization callback | MATLAB expression |
| InputPorts | Array of input port locations | [h1, v1; h2, v2; ...] |
| LinkStatus | Link status of block | none |resolved | unresolved | implicit |
| LoadFcn | Load callback | MATLAB expression |
| ModelCloseFcn | Model close callback | MATLAB expression |
| Name | Block's name | string |
| NameChangeFcn | Block name change callback | MATLAB expression |
| NamePlacement | Position of block name | {normal} | alternate |
| ObjectParameters | Names/attributes of block's parameters | structure |
| OpenFcn | Open callback | MATLAB expression |
| Orientation | Where block faces | {right} | left | down | up |
| OutputPorts | Array of output port locations | [h1, v1; h2, v2; ...] |
| Parent | Name of the system that owns the block | string |
| ParentCloseFcn | Parent subsystem close callback | MATLAB expression |
| Position | Position of block in model window | vector [left top right bottom] not enclosed in quotation marks |
| PostSaveFcn | Postsave callback | MATLAB expression |
| PreSaveFcn | Presave callback | MATLAB expression |
| Selected | Block selected state | on | {off} |

TABLE 2-continued

Common Block Characteristics

| Parameter | Description | Values |
| --- | --- | --- |
| ShowName | Display block name | {on} | off |
| StartFcn | Start simulation callback | MATLAB expression |
| StopFcn | Termination of simulation callback | MATLAB expression |
| Tag | User-defined string | ' ' |
| Type | Simulink ® object type (read-only) | 'block' |
| UndoDeleteFcn | Undo block delete callback | MATLAB expression |
| UserData | Any MATLAB data type | [ ] |
| UserDataPersistent | Save UserData in the model file. | on | {off} |

Table 3 lists examples of characteristics associated with a mask of a Simulink® model.

TABLE 3

Mask Characteristics

| Parameter | Description/Prompt | Values |
| --- | --- | --- |
| Mask | Turns mask on or off. | {on} | off |
| MaskCallbackString | Mask parameter callbacks | delimited string |
| MaskCallbacks | Mask parameter callbacks | cell array |
| MaskDescription | Block description | string |
| MaskDisplay | Drawing commands | display commands |
| MaskEditorHandle | Mask editor figure handle (for internal use) | handle |
| MaskEnableString | Mask parameter enable status | delimited string |
| MaskEnables | Mask parameter enable status | cell array of strings, each either 'on' or 'off' |
| MaskHelp | Block help | string |
| MaskIconFrame | Icon frame (Visible is on, Invisible is off) | {on} | off |
| MaskIconOpaque | Icon transparency (Opaque is on, Transparent is off) | {on} | off |
| MaskIconRotate | Icon rotation (Rotates is on, Fixed is off) | on | {off} |
| MaskIconUnits | Drawing coordinates | Pixel | {Autoscale} | Normalized |
| MaskInitialization | Initialization commands | MATLAB command |
| MaskNames | | |
| MaskPrompts | Prompt (see below) | cell array of strings |
| MaskPromptString | Prompt (see below) | delimited string |
| MaskPropertyNameString | | |
| MaskSelfModifiable | Indicates that the block can modify itself. | on | {off} |
| MaskStyles | Control type (see below) | cell array {Edit} | Checkbox | Popup |
| MaskStyleString | Control type (see below) | {Edit} | Checkbox | Popup |
| MaskTunableValues | Tunable parameter attributes | cell array of strings |
| MaskTunableValueString | Tunable parameter attributes | delimited string |
| MaskType | Mask type | string |
| MaskValues | Block parameter values (see below) | cell array of strings |
| MaskValueString | Block parameter values (see below) | delimited string |
| MaskVariables | Variable (see below) | string |
| MaskVisibilities | Specifies visibility of parameters | |

A wide variety of blocks can be present in a block diagram environment. Each type of block may have specific characteristics pertaining to the nature of the block. An example of block-specific characteristics for a signal routing block associated with a Simulink® model is provided by way of example in Table 4. It is understood that Table 4 is merely an example of block-specific characteristics and that may other types of characteristics may also be used with the invention.

TABLE 4

Signal Routing Block Characteristics

| Block (Type)/ Parameter | Dialog Box Prompt | Values |
|---|---|---|
| Bus Selector (BusSelector) | | |
| InputSignals | | Cell array of the input signals nested to reflect the signal hierarchy |
| Data Store Memory (DataStoreMemory) | | |
| DataStoreName | Data store name | tag {A} |
| InitialValue | Initial value | vector {0} |
| Data Store Read (DataStoreRead) | | |
| DataStoreName | Data store name | tag {A} |
| SampleTime | Sample time | scalar (sample period) {−1} or vector [period offset] |
| Data Store Write (DataStoreWrite) | | |
| DataStoreName | Data store name | tag {A} |
| SampleTime | Sample time | scalar (sample period) {−1} or vector [period offset] |
| Demux (Demux) | | |
| Outputs | Number of outputs | scalar or vector {3} |
| From (From) | | |
| GotoTag | Goto tag | tag {A} |
| Goto (Goto) | | |
| GotoTag | Tag | tag {A} |
| TagVisibility | Tag visibility | {local} | scoped | global |
| Goto Tag Visibility (GotoTagVisibility) | | |
| GotoTag | Goto tag | tag {A} |
| Manual Switch (Manual Switch) (masked) | | |
| Merge | | |
| Multiport Switch (MultiPortSwitch) | | |
| Inputs | Number of inputs | scalar or vector {3} |
| Mux (Mux) | | |
| Inputs | Number of inputs | scalar or vector {3} |
| Switch (Switch) | | |
| Threshold | Threshold | scalar or vector {0} |

State-based and flow diagrams such as those found within Stateflow® from the MathWorks, Inc. of Natick Mass. are also within the scope of the invention. Examples of characteristics in the form of chart object fields are listed in Table 5.

TABLE 5

Stateflow ® Chart Object Characteristics

| Field | Description |
|---|---|
| Name | Stateflow ® diagram name; read-only; click this hypertext link to bring the chart to the foreground. |
| Simulink ® Subsystem | Simulink ® subsystem name; read-only; click this to the foreground |
| Parent | Parent name; read-only; click this hypertext link to display the parent's property dialog box. |
| Update method | Stateflow ® lets you specify the method by which a simulation updates (wakes up) a chart in Simulink ®. Choose from Triggered or Inherited, Sampled, or Continuous. |
| Sample Time | If Update method is Sampled, enter a sample time. |
| Enable C-like bit operations | Select this box to recognize C bitwise operators (~, &, |, ^, >>, and so on) in action language statements and encode them as C bitwise operations. If this box is not selected, the following occurs: & and | are interpreted as logical operators ^ is interpreted as the power operator (for example, 2^3 = 8). The remaining expressions (>>, <<, and so on) result in parse errors. |
| No Code Generation for Custom Targets | Select this box to specify that no code is emitted when building for a custom target. This feature is useful for using Stateflow ® charts to simulate test environments during simulation testing before building to an actual embedded target. |
| Export Chart Level Graphical Functions | Exports graphical functions defined at the chart's root level. |
| Use Strong Data Typing with Simulink ® I/O | If this option is selected, the Chart block for this chart can accept and output signals of any data type supported by Simulink ®. |
| Execute (enter) Chart at Initialization | Select this option if you want a chart's state configuration to be initialized at time 0 instead of at the first occurrence of an input event. |
| Debugger breakpoint | Select On chart entry to set a debugging breakpoint on entry to this chart. |
| Editor | Select Locked to mark the Stateflow ® diagram as read-only and prohibit any write operations. |
| Description | Textual description/comment. |
| Document Link | Enter a Web URL address or a general MATLAB ® command. Examples are www.mathworks.com, mailto: email_address, and edit/spec/data/speed.txt. |

In addition to block diagrams, the invention is also applicable to a wide variety of graphical model environments. Examples of graphical model environments can include dataflow diagrams, state-based diagrams, circuit diagrams, mechanical diagrams, biological diagrams, network diagrams and software diagrams.

Figure 7:
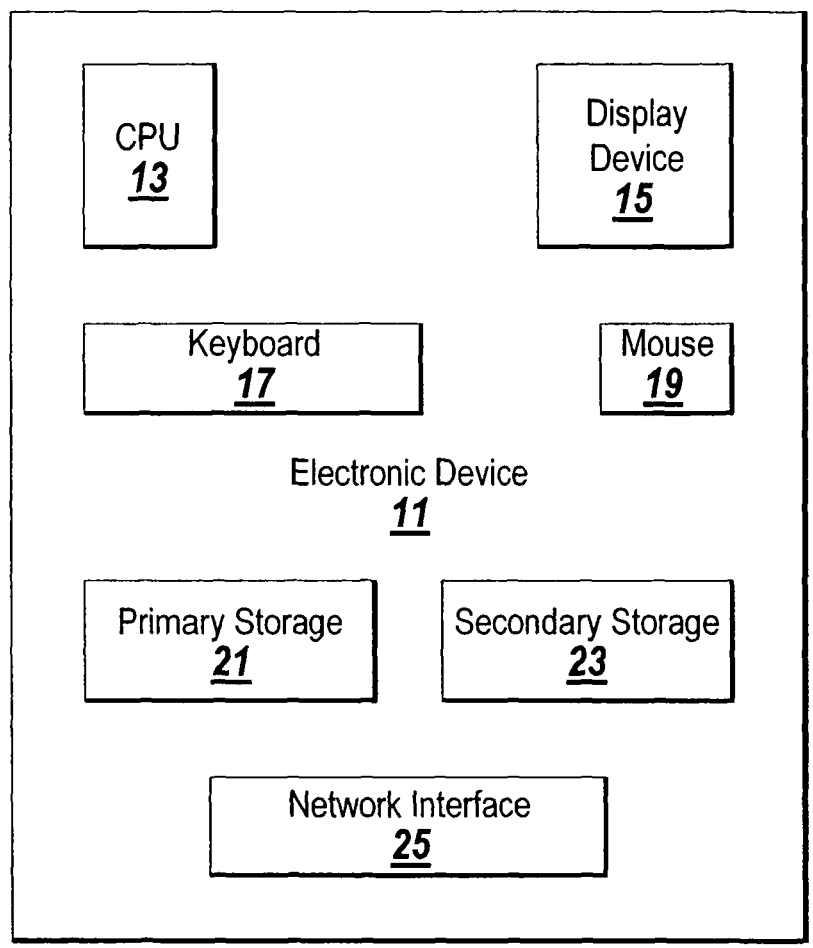
FIG. 7 is a diagrammatic illustration of an electronic device for implementing an aspect of the present invention.

FIG. 7 illustrates one example embodiment of an electronic device 11 suitable for practicing the illustrative embodiment of the present invention. The electronic device 11 is representative of a number of different technologies, such as mainframes, personal computers (PCs), laptop computers, workstations, personal digital assistants (PDAs), Internet appliances, cellular telephones, and the like. In the illustrated embodiment, the electronic device 11 includes a central processing unit (CPU) 13 and a display device 15. The display device 15 enables the electronic device 11 to communicate directly with a user through a visual display. The electronic device 11 may further include a keyboard 17 and a mouse 19. Other potential input devices not depicted include a stylus, trackball, joystick, touch pad, touch screen, and the like. The electronic device 11 may include primary storage 21 and/or secondary storage 23 for storing data and instructions. The storage devices 21 and 23 can include such technologies as a floppy drive, hard drive, tape drive, optical drive, read only memory (ROM), random access memory (RAM), and the like. Applications such as browsers, JAVA virtual machines, and other utilities and applications can be resident on one or both of the storage devices 21 and 23. The electronic device 11 may also include a network interface 25 for communicating with one or more electronic devices external to the electronic device 11. A modem (not shown) is one form of establishing a connection with an external electronic device or network. The CPU 13 has either internally, or externally, attached thereto one or more of the aforementioned components.

Numerous modifications and alternative embodiments of the present invention will be apparent to those skilled in the art in view of the foregoing description. Accordingly, this description is to be construed as illustrative only and is for the purpose of teaching those skilled in the art the best mode for carrying out the present invention. Details of the structure may vary substantially without departing from the spirit of the invention, and exclusive use of all modifications that come within the scope of the appended claims is reserved. It is intended that the present invention be limited only to the extent required by the appended claims and the applicable rules of law.

What is claimed is:

1. A non-transitory computer-readable medium storing instructions, the instructions comprising:
   one or more instructions that, when executed by a processor, cause the processor to:
      identify at least one characteristic common to a plurality of source blocks in an executable block diagram model,
         the at least one characteristic being found in the plurality of source blocks,
         the at least one characteristic having a value,
         the executable block diagram model representing a dynamic system, and
         at least one of the plurality of source blocks representing an elemental dynamic system;
      receive a selection of the at least one characteristic found in the plurality of source blocks,
         the selected at least one characteristic being at least one of a functional attribute, a compiled attribute, an execution data field, a block method, or a block parameter;
      receive a designation of at least one destination block in the executable block diagram model;
      provide, to the designated at least one destination block, the selected at least one characteristic if the selected at least one characteristic is missing from the designated at least one destination block,
         the designated at least one destination block being a subsystem block representing a plurality of lower-level blocks; and
      propagate the value, of the selected at least one characteristic, from at least one source block, of the plurality of source blocks, to the designated at least one destination block,
         the value being propagated to the subsystem block without being propagated to the plurality of lower-level blocks.

2. The non-transitory computer-readable medium of claim 1, where the instructions further comprise:
   one or more instructions that, when executed by the processor, cause the processor to:
      create a data structure for the selected at least one characteristic,
         the data structure having a plurality of substructures.

3. The non-transitory computer-readable medium of claim 1, where the selected at least one characteristic is associated with at least one category of a category list.

4. The non-transitory computer-readable medium of claim 1,
   where the designated at least one destination block is a subsystem block representing a plurality of blocks, and
   where the selected at least one characteristic is propagated to each of the plurality of blocks.

5. The non-transitory computer-readable medium of claim 1, where the instructions further comprise:
   one or more instructions that, when executed by the processor, cause the processor to:
      undo the propagating by returning the designated at least one destination block to a condition existing prior to the propagating.

6. The non-transitory computer-readable medium of claim 1, where the one or more instructions to provide the selected at least one characteristic include one or more instructions to propogate less than all characteristics of the at least one source block.

7. The non-transitory computer-readable medium of claim 1, where the providing of the selected at least one characteristic involves propagating less than all characteristics of the at least one source block, as specified by a user.

8. The non-transitory computer-readable medium of claim 1, where the selection of the at least one characteristic is received from a Graphical User Interface (GUI).

9. The non-transitory computer-readable medium of claim 1, where the selection of the at least one characteristic is received via a use of a shortkey.

10. The non-transitory computer-readable medium of claim 1, where the instructions further comprise:
    one or more instructions that, when executed by the processor, cause the processor to:
       automatically determine less than all characteristics of the at least one source block based on characteristics of the at least one source block and characteristics of the designated at least one destination block, and
    wherein the propagating involves propagating where the determined less than all characteristics of the at least one source block include the selected at least one characteristic.

11. The non-transitory computer-readable medium of claim 1, where the instructions further comprise:
    one or more instructions that, when executed by the processor, cause the processor to:
       store information relating to the propagating; and
       enable repeating the propagating based on the stored information.

12. The non-transitory computer-readable medium of claim 11, where the stored information relates to multiple iterations of the propagating.

13. The non-transitory computer-readable medium of claim 1, where the instructions further comprise:
    one or more instructions that, when executed by the processor, cause the processor to:
       determine which blocks of the executable block diagram model have characteristics corresponding to the selected at least one characteristic.

14. The non-transitory computer-readable medium of claim 1, where the instructions further comprise:
    one or more instructions that, when executed by the processor, cause the processor to:
       determine which blocks of the executable block diagram model have characteristics to be propagated to the designated at least one destination block.

15. The non-transitory computer-readable medium of claim 1, where the selection of the at least one characteristic is received before receiving the designation of the at least one destination block.

16. The non-transitory computer-readable medium of claim 1, where the designation of the at least one destination block is performed from a text-based list.

17. The non-transitory computer-readable medium of claim 1, where the designated at least one destination block does not have the selected at least one characteristic before the providing of the selected at least one characteristic.

18. A method comprising:
identifying, using a computer, at least one characteristic common to a plurality of source blocks in an executable block diagram model,
the at least one characteristic being found in the plurality of source blocks, and
the executable block diagram model representing a dynamic system;
receiving, using the computer, a selection of the at least one characteristic found in the plurality of source blocks,
the selected at least one characteristic including at least one of a functional attribute, a compiled attribute, an execution data field, a block method, or a block parameter;
receiving, using the computer, a designation of at least one destination block in the executable block diagram model;
providing, using the computer, the selected at least one characteristic to the at least one destination block; and
propagating, using the computer, a value, of the selected at least one characteristic, from at least one source block, of the plurality of source blocks, to the at least one destination block,
the at least one destination block being a subsystem block representing a plurality of lower-level blocks, and
the propagating of the value being restricted to propagating the value to the subsystem block without propagating the value to the plurality of lower-level blocks.

19. The method of claim 18, further comprising:
determining that the at least one destination block is a same block type as the at least one source block.

20. The method of claim 18,
where the at least one destination block is designated based on the selected at least one characteristic, and
where the selected at least one characteristic matches a characteristic of the at least one destination block.

21. The method of claim 20, where the selected at least one characteristic of the at least one destination block indicates that the at least one destination block is representative of a virtual subsystem.

22. The method of claim 18,
where the at least one destination block is a subsystem representing a plurality of blocks, and
where the selected at least one characteristic is propagated to each of the plurality of blocks in the subsystem.

23. The method of claim 18, where providing the selected at least one characteristic to the designated at least one destination block comprises:
determining, based on the selection of the at least one characteristic and the designation of the at least one destination block, that the selected at least one characteristic is missing from the designated at least one destination block, and
providing the selected at least one characteristic to the designated at least one destination block based on determining that the selected at least one characteristic is missing from the designated at least one destination block.

24. A system comprising:
a memory to store information for an executable block diagram model of a dynamic system,
the executable block diagram model including a plurality of blocks,
the plurality of blocks including a plurality of source blocks; and
a processor to:
identify at least one characteristic common to the plurality of source blocks,
the at least one characteristic being found in the plurality of source blocks,
receive a selection of the at least one characteristic found in the plurality of source blocks, and
the selected at least one characteristic including at least one of a functional attribute, a compiled attribute, an execution data field, a block method, or a block parameter,
receive information identifying a designated destination block in the plurality of blocks,
provide the selected at least one characteristic to the designated destination block, and
provide a value, of the selected at least one characteristic, from at least one source block, of the plurality of source blocks, to the designated destination block,
the designated destination block being a subsystem block representing a plurality of lower-level blocks, and
the value being provided to the subsystem block without being provided to the plurality of lower-level blocks.

25. The system of claim 24, where, when providing the selected at least one characteristic to the designated destination block, the processor is to:
determine that the selected at least one characteristic is missing from the designated destination block, and
provide the selected at least one characteristic to the designated destination block based on determining that the selected at least one characteristic is missing from the designated destination block.

26. An apparatus comprising:
a processor to:
identify at least one characteristic common to a plurality of source blocks in an executable block diagram model:
the at least one characteristic being found in the plurality of source blocks, and
the executable block diagram model representing a dynamic system;
receive a selection of the at least one characteristic common to the plurality of source blocks,
the selected at least one characteristic including at least one of a functional attribute, a compiled attribute, an execution data field, a block method, or a block parameter;
receive a designation of at least one destination block in the executable block diagram model;
determine, based on the selection of the at least one characteristic and the designation of the at least one destination block, that the at least one characteristic is missing from the at least one destination block; and provide the selected at least one characteristic to the at least one destination block based on determining that the at least one characteristic is missing from the at least one destination block.

27. The apparatus of claim 26, where the selection of the at least one characteristic is received via a Graphical User Interface (GUI).

28. A non-transitory computer-readable medium storing instructions, the instructions comprising:
one or more instructions that, when executed on a processor, cause the processor to:
select identify a selection of at least one characteristic found in a first source block and a second source block in an executable block diagram model representing a dynamic system,
at least one of the first source block or the second source block representing an elemental dynamic system,
the selected at least one characteristic including at least one of a functional attribute, a compiled attribute, an execution data field, a block method, or a block parameter,
the first source block including the selected at least one characteristic of a first value,
the second source block including the selected at least one characteristic of a second value;
receive an input identifying a first block as a first destination block and a second block as a second destination block in the executable block diagram model,
the first destination block and the second destination block receiving the selected at least one characteristic from the first source block and the second source block;
determine, based on the selection of the at least one characteristic and the input identifying the first block as the first destination block, that the selected at least one characteristic is missing from the first destination block;
provide the selected at least one characteristic to the first destination block based on determining that the selected at least one characteristic is missing from the first destination block; and
propagate the first value to the first destination block and the second value to the second destination block.

29. The non-transitory computer-readable medium of claim 28, where the one or more instructions to propagate the first value and the second value include one or more instructions to determine the first destination block and the second destination block by use of respective contexts relative to the first source block and the second source block.

30. A non-transitory computer-readable medium storing instructions, the instructions comprising:
one or more instructions that, when executed by a processor, cause the processor to:
identify at least one characteristic of a source line associated with a first block and a second block of an executable block diagram model,
the executable block diagram model representing a dynamic system,
a block of the executable block diagram model representing an elemental dynamic system,
the source line representing at least one signal;
receive a selection of the at least one characteristic of the source line,
the selected at least one characteristic including at least one of a functional attribute, a compiled attribute, an execution data field, a block method, or a block parameter;
receive an input identifying at least one line as a destination line associated with a third block and a fourth block of the executable block diagram model,
the destination line receiving the selected at least one characteristic from the source line;
determine, based on the selection of the at least one characteristic and the input identifying the destination line, that the selected at least one characteristic is missing from the destination line; and
propagate the selected at least one characteristic to the destination line based on determining that the selected at least one characteristic is missing from the destination line.

* * * * *

UNITED STATES PATENT AND TRADEMARK OFFICE
CERTIFICATE OF CORRECTION

PATENT NO. : 8,875,039 B2  
APPLICATION NO. : 10/717412  
DATED : October 28, 2014  
INVENTOR(S) : Michael H. McLernon et al.

It is certified that error appears in the above-identified patent and that said Letters Patent is hereby corrected as shown below:

IN THE CLAIMS:

Please correct Claim 10 as follows:

Column 28, line 40, delete "wherein the propagating involves propagating".

Signed and Sealed this
Eighth Day of September, 2015

Michelle K. Lee
*Director of the United States Patent and Trademark Office*